United States Patent [19]

Schan, Jr. et al.

[11] Patent Number: 5,003,466
[45] Date of Patent: Mar. 26, 1991

[54] MULTIPROCESSING METHOD AND ARRANGEMENT

[75] Inventors: Edward P. Schan, Jr., Woodridge; Brian K. Strelioff, Lisle, both of Ill.

[73] Assignee: AT&T Bell Laboratories, Murray Hill, N.J.

[21] Appl. No.: 12,089

[22] Filed: Feb. 6, 1987

[51] Int. Cl.⁵ .................... G06F 09/30; G06F 11/00
[52] U.S. Cl. ................... 364/200; 364/230.4; 364/264.5; 364/265.3; 364/265.6
[58] Field of Search .......... 364/200 MS File, 300, 364/900 MS File

[56] References Cited

U.S. PATENT DOCUMENTS

| | | | |
|---|---|---|---|
| 3,631,405 | 12/1971 | Hoff et al. ...................... | 340/172.5 |
| 4,215,400 | 7/1980 | Denko ............................ | 364/200 |
| 4,253,145 | 2/1981 | Goldberg ........................ | 364/200 |
| 4,459,661 | 7/1984 | Kaneda et al. ................. | 364/200 |
| 4,494,188 | 1/1985 | Nakane et al. ................. | 364/200 |
| 4,591,975 | 5/1986 | Wade et al. .................... | 364/200 |
| 4,703,419 | 10/1987 | Krause et al. .................. | 364/200 |
| 4,729,094 | 3/1988 | Zolnowsky et al. ............ | 364/200 |
| 4,914,570 | 4/1990 | Peacock ......................... | 364/200 |

OTHER PUBLICATIONS

M. J. Bach, *The Design of the UNIX TM Operating System*, (Prentice-Hall, Inc., 1986), pp. 391–411.
VAX 11/782 Brochure (Digital Equipment Corporation).
G. H. Goble & M. H. Marsh, *A Dual Processor VAX 11/780*, (Purdue University, TR-EE81-31, 9-81).
*UNIX TM Microsystem WE® 32100 Microprocessor Information Manual*, (AT&T Technologies, Inc., 1-85), pp. 4-1 to 4-79.
P. A. Grasso et al., "Operating System for a Dedicated Common Memory Multimicroprocessor System", *IEE Proceedings*, vol. 129, Pt. E, No. 5 (Sep. 82), pp. 200-205.

*Primary Examiner*—Eddie P. Chan
*Attorney, Agent, or Firm*—David Volejnicek

[57] ABSTRACT

A master-slave multiprocessor (FIG. 1) is formed by connecting a slave processor (25) to an I/O slot of a uniprocessor, and by minimally modifying the uniprocessor's operating system. At initialization, one routine (FIG. 5) redirects slave interrupt vectors (200) to point to a common interrupt handler (FIG. 12). Before a process executes on the slave processor, another routine (FIGS. 9 and 10) corrupts execution stack bounds (217, 218) of the process. A non-interrupt operating system call during execution of the process causes an automatic firmware check (FIG. 3) of the execution stack pointer (203) against the stack bounds. Occurrence of an interrupt or encounter of a stack exception results in suspension of process execution and invocation of the interrupt handler or a slave stack exception handler (FIG. 11), respectively. Each handler calls a slave delete routine (FIG. 15) to restore the process' stack bounds to valid values and to transfer the process for execution to the master processor (12). On the master processor, process execution resumes at the point of suspension, and the operating system service required by the system call or interrupt is carried out.

28 Claims, 16 Drawing Sheets

MULTIPROCESSING METHOD AND ARRANGEMENT

CROSS-REFERENCE TO RELATED APPLICATION

Application of B. K. Strelioff entitled "Multiprocessing Method and Arrangement", filed on even date herewith and assigned to the same assignees as this application, shares with this application a substantially identical disclosure.

1. Technical Field

The invention relates to a multiprocessor system generally, and in particular to the manner in which functions are distributed and control is transferred between processors in a multiprocessor system.

2. Background of the Invention

In comparison with uniprocessor computer systems, multiprocessor computer systems are typically complex in design, in terms of both hardware and software. For example, multiprocessor systems typically require special and complex inter-processor communication mechanisms and protocols, special arrangements for access by a plurality of processors to shared input and output resources, and memory and other resource locking arrangements to avoid race conditions and simultaneous-access conflicts between processors.

Many of these complexities may be avoided by means of a master-slave multiprocessor configuration, wherein one or more slave processors perform only user-instruction processing and transfer processes for operating system service processing to a master processor. With respect to I/O devices and other periphery, such a system appears as, and hence may be interacted with as, a uniprocessor consisting of the master processor. Many operating system complexities involving shared-resource locking, race condition avoidance, and other interprocessor cooperation matters are avoided thereby.

Nevertheless, many complexities still remain in such a multiprocessor design, especially in the operating system software, because of the need for the plurality of processors to communicate and transfer control from one to another. Consequently, it is a problem in the art that a uniprocessor is typically not "growable" into a multiprocessor, and that a uniprocessor may be converted into a multiprocessor only through extensive operating system redesign, and that changes required to be made to convert a uniprocessor system design into a multiprocessor system design are not transparent to application programs.

SUMMARY OF THE INVENTION

This invention is directed to solving the problems of the prior art. Illustratively according to the invention, a multiprocessor system is operated in the following manner: existence of a predetermined condition—illustratively a fault such as a stack bounds exception—is ensured, so that when an attempt is made during execution of a process on a first—a slave—processor to transfer execution to a function that is not to be executed on the first processor, and an accompanying check for existence of the condition is made, the predetermined condition is encountered, causing execution of a handling function Execution of the handling function transfers the process for execution to a second—the master—processor.

According to the invention, a multiprocessor system that includes the first and the second processor also includes a first arrangement for ensuring existence of the predetermined condition, and a second arrangement for checking for existence of the predetermined condition. The second arrangement does so in response to an attempt being made during execution of a process in the first processor to transfer execution to a function that is not to be executed on the first processor. Illustratively, such a function is an operating system function that executes in privileged execution mode, and such an attempt is a call to the function. The second arrangement encounters the predetermined condition, and responds by causing execution of a handling function. A third arrangement of the system—illustratively the central processing unit of a processor—executes the handling function, which transfers the process for execution to the second processor.

According to an illustrative embodiment of the invention, when an attempt is made during process execution in user execution mode on the slave processor of a multiprocessor system to enter privileged execution mode to obtain operating system services, a fault such as a stack bounds exception or a memory exception is caused to be encountered by the slave processor's hardware or firmware that automatically checks for existence of such a fault before privileged mode is allowed to be entered. This encounter leads to execution of a handling function that results in a transfer of the process for execution to the master processor. Execution of the transferred process resumes on the master processor substantially at a point at which execution stopped on the slave processor. Illustratively, execution of an interrupted instruction of the process is either restarted or merely completed on the master processor. In the former case, the attempt to enter privileged mode is repeated on the master processor, as is the check for the fault; however the fault is not caused to be encountered on the master processor. Consequently in either case, privileged mode is entered and the operating system service is provided by the master processor.

The advantage of operating a multiprocessor system in the master-slave configuration is the resultant simplicity of the operating system: complexities associated with memory locking mechanisms and race condition resolution are significantly reduced, and complexities associated with user and input and output (I/O) interfaces are thereby avoided. The above-summarized manner of configuring and operating a multiprocessor system of the master-slave type yields further simplifications of the operating system, and also of the multiprocessor hardware. Advantageously, a multiprocessor can now be constructed from a uniprocessor merely by adding a conventional processor's hardware to a conventional uniprocessor system (for example, by simply connecting the new processor's hardware to a slot of the uniprocessor's communication bus), and by making minimal changes to the uniprocessor system's operating system software. Advantageously, changes that would conventionally be required to be made to the multitudes of routines through which operating system services may be invoked on a slave processor are avoided. The minimal changes that remain allow the multiprocessor operating system software to run on the uniprocessor effectively with no degradation in performance, so that a uniprocessor system may be constructed whose later, e.g. field, upgrade to a multiprocessor requires no changes to the operating system software.

Advantageously as a result of the invention, the required changes to the uniprocessor operating system to convert it into a multiprocessor system are of such a nature that user and I/O interfaces are preserved intact, thus providing both source code and binary code compatibility with existing applications. From a customer's, a user's, or a developer's view, the conversion to multiprocessing introduces no incompatibilities or intricacies to the operating system. Additionally, all functionality provided by the multiprocessor system is available to all applications regardless of which processor they are presently executing on; only a single virtual machine image is presented to all processes. Uniprocessor system performance may thus be improved by system growth into a multiprocessor system without having to recode, recompile, redesign, redistribute, reformat, relink, remake, restructure, or replace existing applications.

These and other advantages and features of the present invention will become apparent from the following description of an illustrative embodiment of the invention taken together with the drawing.

DETAILED DESCRIPTION

Figure 1:
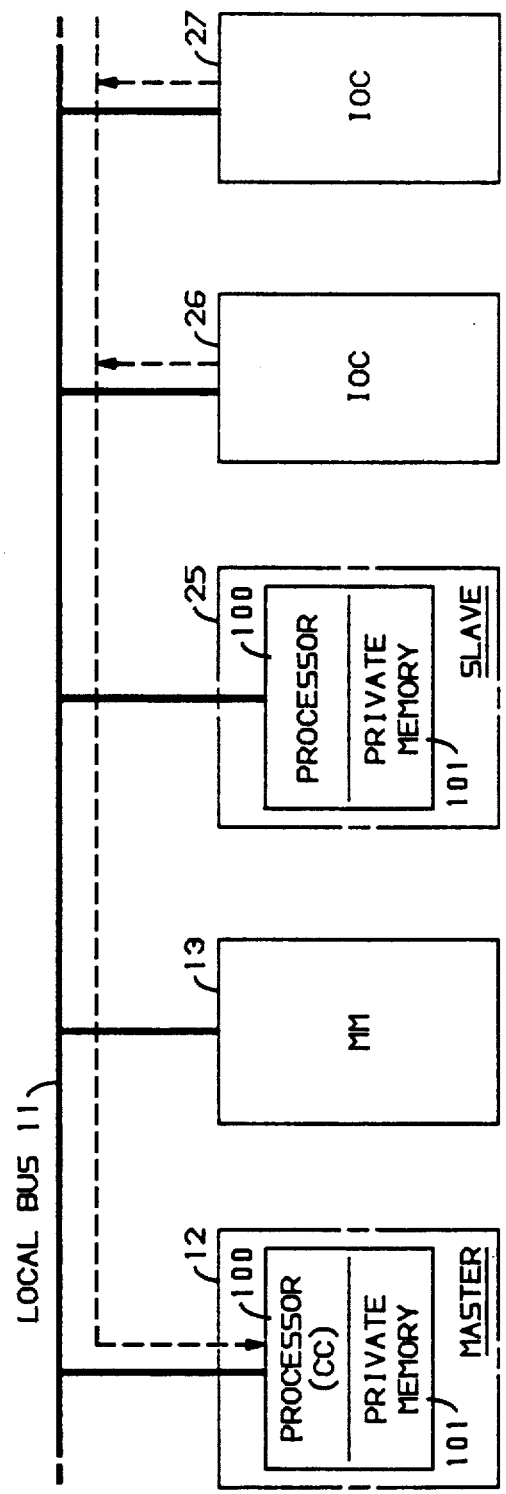
FIG. 1 is a block diagram of a computer system embodying an illustrative implementation of the invention.

FIG. 1 shows an illustrative multiprocessor system which is based on the AT&T 3B15 computer. The 3B15 system comprises a plurality of units, or stations, of which four stations 12, 13, 26, and 27 are shown. Various functions that need to be performed by the system are distributed among the stations. Each station of the system is dedicated to performing some function, which function is commonly different from the functions of the other stations, but the stations cooperate with each other in carrying out system tasks. Thus, for example, a first station 12 functions as the principal processor and central controller of the system, performing data processing operations and coordinating system activities; a second station 13 functions as the main memory (MM) of the system, providing control of storage in, and retrieval from, memory of programs executing in processor 12 and of data required or produced by processor 12 during program execution; and third and fourth stations 26 and 27 function as input and output controllers (IOC), controlling and coordinating the functions of various peripheral devices that provide the system with bulk storage or communications with the outside world. Other stations (not shown) with similar or different functional capabilities as the stations 12, 13, 26, and 27 may be included in the 3B15 system. The function of each station is dictated by its internal composition and, in the case of an intelligent station, by the programs executing on its processor. Stations may be added to or deleted from the system as required by the applications to which the system is being put.

For the purpose of cooperating with each other in carrying out system tasks, the stations of the system are interconnected by a local bus (LB) 11, which serves as the communication medium for the stations and allows any station within the system to communicate with any other station.

Hardware of the 3B15 computer is expanded to a multiprocessor configuration by means of a second processor 25 being connected to local bus 11. A single-board processor is connected to a single expansion station slot of local bus 11 in the manner of any other station. However, a dual-board processor—one that is identical to the conventional 3B15 processor 12, for example—occupies two expansion station slots of local bus 11. In this latter arrangement, an additional private processor communication bus must be connected between the two boards of processor 25, to provide connections equivalent to those conventionally provided by local bus 11 between the two station slots dedicated to processor 12. Irrespective of what board configuration is used to implement processor 25, all I/O peripheral interrupts are connected by local bus 11 only to master processor 12 and not to slave processor 25 This is indicated in FIG. 1 by the dashed line paralleling local bus 11.

Processors ]2 and 25 each illustratively comprise an AT&T WE ® 32100 microprocessor acting as the processor's central processing unit (CPU), two WE 32101 demand-paged memory management units (MMUs) and a WE 32106 math acceleration unit (MAU). These units are together labeled as 100. Though processors 12 and 25 share use of memory 13, each has on-board dedicated, or private, memory, labeled 101. I/O units 26–27 include a disk in support of demand-paged memory 13.

Processors 12 and 25 run under control of a demand-paged version of the UNIX ® operating system of AT&T. The operating system is substantially the conventional, uniprocessor version, modified as described below.

To make clear the purpose and effect of the modifications, a brief overview of the conventional operation of the uniprocessor and of the desired operation of the multiprocessor is in order. A full description of the WE 32100 microprocessor may be found in "UNIX TM Microsystem WE ® 32100 Microprocessor Information Manual" published by Document Development Organization-Microelectronics Projects Group, AT&T Technologies, Inc., Morristown, New Jersey. Hence, a brief description is presented below only of certain aspects of the operation that are deemed necessary for a full appreciation of the illustrative embodiment of the invention.

Typically, the 3B15 system uses two modes, or levels, of operation of the WE 32100 microprocessor: a user mode for executing user program instructions, and a privileged mode for executing functions such as operating system instructions that have the potential for corrupting shared system resources such as hardware resources. There are two mechanisms for entering privileged mode from user mode: a process switch mechanism and a system call mechanism. The system call mechanism is also known by names such as a supervisory call and an operating system trap.

The system call effectively acts as a subroutine call. It provides a means of controlled entry into a function by installing on a processor a new processor status word (PSW) and program counter (PC). The system call mechanism is used by explicit operating system GATE calls to transfer control from user to privileged mode, and is also used to handle "normal" system exceptions. ("Quick" interrupts, which would also be handled by this mechanism, are not used by the UNIX operating system or similar environments, and hence are ignored in this discussion ) An exception is an error condition—a fault or a trap—other than an interrupt. Normal exceptions constitute most system exceptions. The normal exception handlers are privileged-mode functions.

The system call mechanism uses the execution stack of the present process; that is, a normal exception handler or a function called via a GATE instruction that uses for its execution the execution stack of the process that was executing when the exception or the GATE call occurred.

Figure 2:
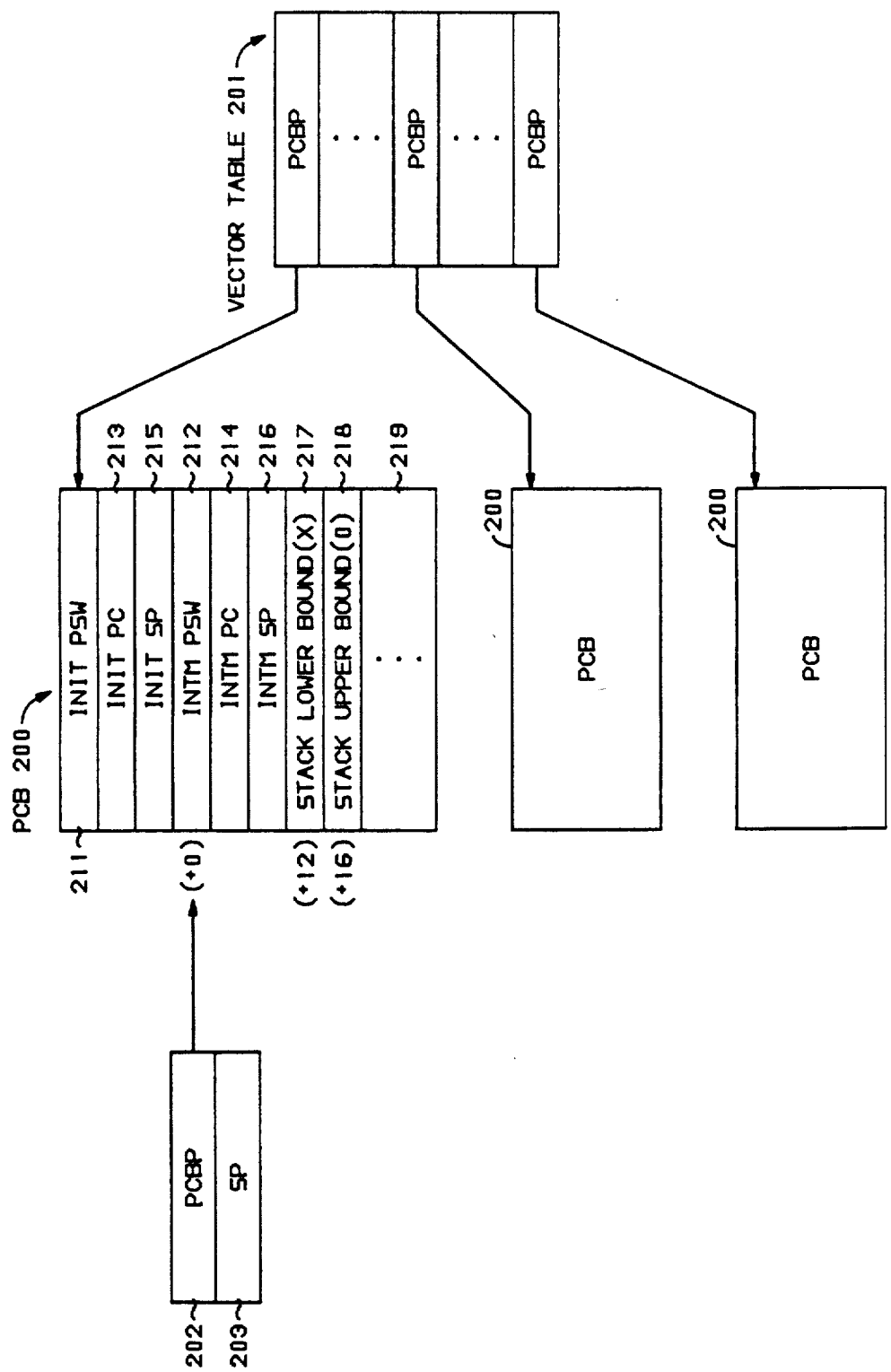
FIG. 2 is a block diagram of a process control block and pointers of the system of FIG. 1.

Each execution stack has upper and lower bounds, which are maintained in the process control block (PCB) of the process that is using the stack. A typical process control block 200 is shown in FIG. 2. The process control block is a data structure in memory 13 that contains the hardware context of the process when the process is not running. This context consists of the initial and intermediate (present) contents 211 and 212 of the processor status word (a register that contains status information about the microprocessor and the presently-executing process), the initial and intermediate contents 213 and 214 of the program counter, the initial and intermediate contents 215 and 216 of the execution stack pointer (SP), the lower bound value 217 and the upper bound value 218 for the execution stack, and other information 219 such as the last contents of general purpose registers, frame and argument pointers, and block move specifications.

Figure 3:
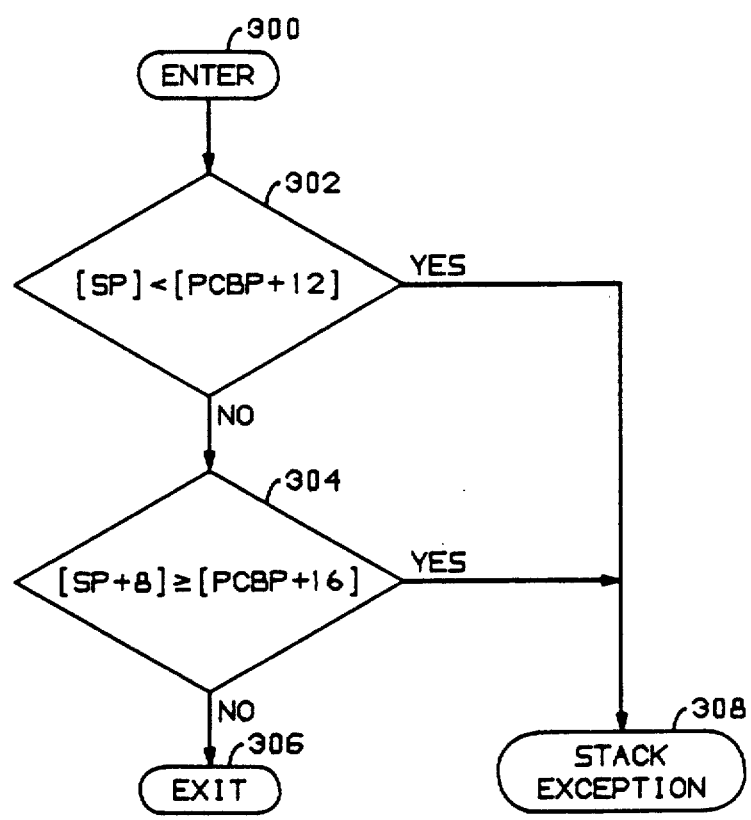
FIG. 3 is a flow diagram of a system call microsequence routine of the system of FIG. 1.

In a transition from non-privileged state to privileged state, the system must always perform checks to ensure that the privileged state will not become corrupted. Therefore, prior to making a legal entry of a privileged function, i.e., before executing a transfer to the privileged mode upon the occurrence of a normal exception or a GATE request, the system call mechanism checks the present execution stack pointer value against the execution stack boundary values that are stored in the process control block of the presently-executing process, in the manner shown in FIG. 3. Process control block pointer (PCBP) 202 and stack pointer (SP) 203 are special registers of the microprocessor. The present value of PCBP 202 points to an intermediate value of the presently-executing process' PCB 200 (see FIG. 2). The check is entered at step 300, and the present value of stack pointer 203 is compared with the contents of PCB location offset from PCBP 202 by 12, which is stack lower bound 217, at step 302. If the stack pointer value exceeds the lower bound, the present value of stack pointer 203 plus eight is compared with the contents of PCB location offset from PCBP 202 by 16 (decimal), which is stack upper bound 218, at step 304. The transfer occurs only if the stack pointer value falls within the specified bounds, at step 306; if the stack pointer does not fall within the specified bounds, a stack exception is generated, at step 308. The microprocessor performs the check automatically, either directly in hardware or by execution of a micro-instruction, i.e., firmware, sequence.

If the stack pointer is found to fall within the specified bounds upon the occurrence of a GATE call or a normal exception, the processor handles the normal exception or GATE request within the process in which it occurred: the processor status word and the program counter of the process that was executing when the system call mechanism was activated are stored on that process' execution stack, the stack pointer is incremented, and the program counter and processor status word of the called function are loaded into the program counter and processor status word registers. These activities are likewise performed automatically. either by hardware or by execution of a micro-instruction sequence. Illustratively, GATE calls and normal exceptions have their own separate micro-instruction sequences.

The process switch mechanism is used by interrupts and "non-normal" exceptions including the stack exception. The process switch mechanism uses a different execution stack for the old and the new processes. Thus, for example, the stack exception handler process has its own execution stack different from the execution stack of the excepted-to process. Similarly, the interrupt handler process has its own execution stack different from the execution stack of the interrupted process. Because a different execution stack is used for each interrupt handler and non-normal exception handler, the execution stack bounds check is not performed upon the occurrence of an interrupt or a non-normal exception.

On leaving a process during an interrupt or a stack exception process switch, the microprocessor saves that process' process control block pointer on a system-wide interrupt stack, and then writes the process' hardware context—the present program counter, stack pointer, and processor status word values, as well as the contents of other registers commonly stored in the process control block—in that process' process control block (pointed to by the present value of the process control block pointer). To enter a new process, the microprocessor obtains the process control block pointer of the new process and uses it to access the process control block of the new process and to load therefrom the new process' hardware context into the hardware registers.

The above-described activities are performed automatically by the microprocessor, either directly in hardware or by execution of a micro-instruction sequence. Illustratively, the interrupts and each of the non-normal exceptions have their own separate micro-instruction sequence.

The micro-instruction sequences of the system call and process switch mechanisms locate the processor status word and program counter of a new function, or the process control block pointer of a new process, in vector tables provided by the operating system. For normal exceptions and GATE calls, the operating system provides a pointer table which contains starting addresses for a set of handling-routine tables, and the handling-routine tables themselves. Each handling-routine table contains the processor status word and program counter values for a group of functions. For non-normal exceptions, the operating system provides an exception-vector table which contains the process control block pointers of the non-normal exception handler processes. And for interrupts, the operating system provides an interrupt vector table which stores the initial process control block pointers of interrupt handler processes. An illustrative vector table 201 is shown in FIG. 2.

For purposes described in the Background portion of this document, it is desirable to have processors 12 and 25 operate in a master-slave configuration. In such a configuration, slave processor 25 performs substantially only user-mode processing, that is, processing that does not make use of operating system (privileged) services, and master processor 12 performs substantially all processing that involves operating system services, in addition to performing user-mode processing. Any process executing on slave processor 25 that requires operating system services for its continued execution is transferred for execution to master processor 12.

To enable the inter-processor transfer to be made with minimal modifications of the operating system, a process executing on slave processor 25 is allowed to execute thereon until execution of an instruction thereof results in an invocation of an operating system service, or until detection of some asynchronous event requiring performance of operating system services for the process. An example of the latter is the expiration of an alarm clock timer. At that point, execution of the process on slave processor 25 is suspended. Execution of the instruction that resulted in the invocation of the operating system service is not completed on slave processor 25. The process is transferred to master processor 12. Execution on master processor 12 of the transferred process is resumed with the interrupted instruction. Illustratively, the execution of the interrupted instruction is either restarted on master processor 12, or execution of the partially-executed instruction is merely completed on master processor 12. Unless the condition that caused the attempt to enter privileged mode was a transient fault, execution of that instruction on master processor 12 results in the invocation of the operating system service. That service is then provided in a conventional, uniprocessor, manner on master processor 12. Illustratively, execution of the transferred process then continues on master processor 12.

To enable the above-described transfer of a process from slave processor 25 to master processor 12 to be made without having to extensively modify operating system functions or processes invokable on slave processor 25 such that invocation thereof would result in the invoking process being transferred to master processor 12, all attempts made on slave processor 25 of this illustrative system to enter privileged mode are either caused to encounter a predetermined condition which in turn results in invocation of a handler that is common to all those attempts, or are redirected to a common handler. The invoked handler then performs the abovedescribed process transfer The handler is invoked automatically on slave processor 25, either directly by hardware or by execution of a micro-instruction sequence.

Figure 4:
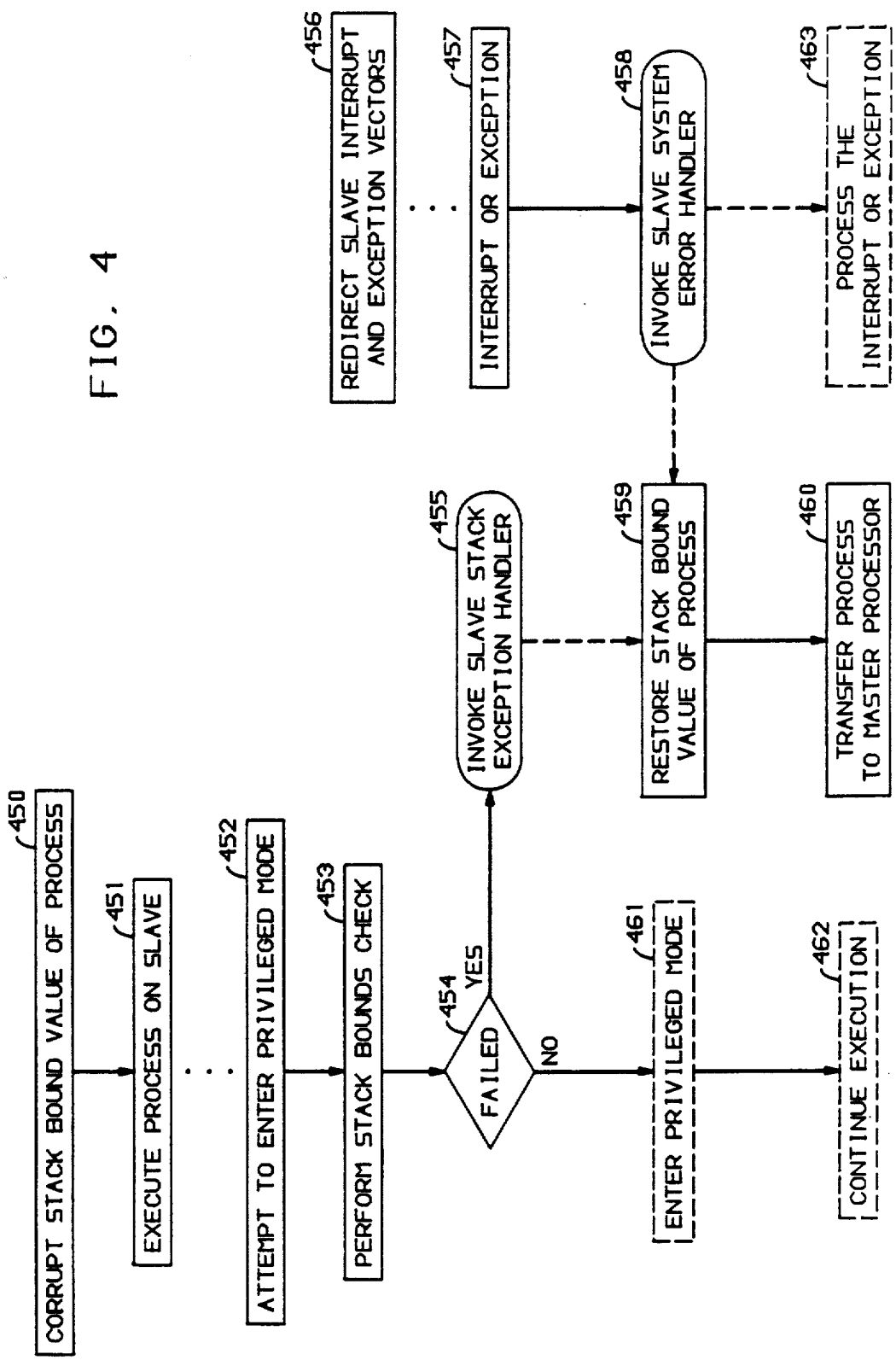
FIG. 4 is a flow diagram summarizing the steps involved in ensuring transfer of processes for privileged mode execution from the slave to the master processor of FIG. 1.

The automatic invocation is basically accomplished as shown in FIG. 4 . Execution stack bounds 217, 218 stored in process control block 200 of a process are given an improper value, at step 450, before the process is executed on slave processor 25. This ensures failure, at step 454, of the stack bounds check performed, at step 453, during an attempt to enter privileged execution mode, at step 452, via a GATE call or occurrence of a normal exception. The failure of the check results in invocation of the stack exception handler process, at step 455. Also, at system initialization, interrupt and exception process control blocks are set up for slave processor 25 in its private memory 101, and values therein for handlers of interrupts and non-normal exceptions that may occur on slave processor 25 are redirected, at step 456, to the value of an error-handler process that is a duplicate of the stack exception handler process for purposes of this application (An alternative to using private on-board memory is to duplicate virtual-to-physical translation tables, one for each processor, and replace appropriate entries therein so as to provide each processor with different, exclusive, virtual-to-physical translations for certain ranges of virtual addresses.) Upon occurrence of an interrupt or non-normal exception on slave processor 25, at step 457, these values cause invocation of the handler process, at step 458. The stack exception and error handler processes of the slave processor 25 are communication processes that restore, at step 459, to a proper value the stack bounds of the user process that was executing on slave processor 25 at the time the handler process was invoked, and transfer that user process for execution from slave processor 25 to master processor 12, at step 460. (Had the stack bounds check not failed at step 454, privileged execution mode would have been entered on slave processor 25, at step 461, and program execution would have continued in that mode, at step 462, as is done on master processor 12. Similarly, had the vectors not been redirected at step 456, a conventional handler would have been invoked at step 458 that would have processed the interrupt or condition, at step 463, as is done on master processor 12.)

Returning now to a consideration of the system of FIG. 1, uniprocessor system initialization is modified therein as shown in FIG. 4.

Figure 5:
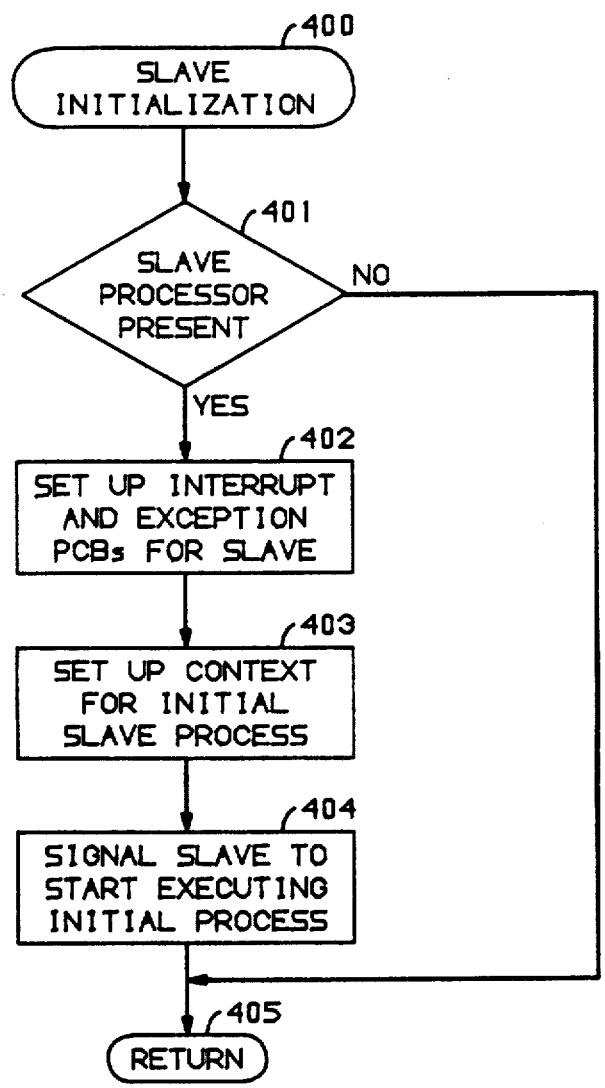
FIGS. 5–v17 are flow diagrams of various operating system routines of the system of FIG. 1.

As part of master initialization of all system hardware, master processor 12 executes a slave initialization routine flowcharted in FIG. 5. After entering execution of the routine, at step 400, master processor 12 checks whether the system is a uniprocessor or a multiprocessor system, that is, whether processor 25 is present in the system of FIG. 1, at step 401. Processor 12 makes the determination by examining contents of a conventional firmware device table. Illustratively, since the board identification for slave processor 25 is identical to that of master processor 12 and the board address for master processor 12 is fixed, the search for slave processor 25 is performed by scanning the equipped device table looking for a processor board located at an address other than the fixed address.

If no slave processor 25 is found at step 401, processor 12 sets a UTILIZE variable in memory 13 to a zero value to indicate that there is no slave processor 25 in the system, and then returns to the master initialization routine to complete system initialization in the conventional uniprocessor manner, at step 405.

If the system is found, at step 401, to be equipped with a slave processor 25, the next step in the initialization is to set up separate process control blocks for exceptions and error conditions that can occur on both processors 12 and 25, at step 402. This is necessary because if the process control blocks are common to both processors 12 and 25, master processor 12 could be executing out of a process control block and have the slave processor 25 start trying to execute out of the same process control block, thus leading to register and stack corruption. Therefore, separate process control blocks are setup for stack exceptions and system error exceptions, by changing the process control block pointer value in main memory 13 to point to a process control block located in the address range of private memory 101 of processors 12 and 25, thus giving common virtual addresses and physical addresses, yet different physical locations and values, to the master's and the slave's process control blocks These newly-mapped process control block pointers are used by both master and slave processors 12 and 25, and therefore the initialization of the private memory 101-resident process control blocks must be performed for all processors 12 and 25.

Next, the newly-placed process control blocks are initialized in private memory 101 of master processor 12, at step 402. Although only 5 fields in the process control block require initialization (initial program counter, initial program status word, initial stack pointer, stack lower bound, and stack upper bound), the initialization is done by copying over the entire contents of the "original" process control block, to simplify the code.

Up to now, all modifications of private memory have been performed on private memory 101 of master processor 12 and must be replicated for the slave processor's private memory. This replication is done by copying a dpccram_t data structure, which contains all per-processor data elements and which is now resident in private memory 101 of master processor 12, to private memory 101 of slave processor 25, and then changing specific slave-related variables therein, at step 402. Not all elements of the structure need to be changed, but only those pertaining to interrupts and exceptions that can occur on slave processor 25.

At this point, slave processor 25 still has not been activated. To actually activate slave processor 25, it is first necessary to prepare a control block for an initial process (see FIG. 6) of slave processor 25, at step 403. This involves placing the physical address of the slave's initial process control block in the first entry in the slave's interrupt stack, and setting the initial program counter to the physical address of the slave routine to enable virtual addressing via the conventional ENBVJMP instruction (see step 503 of FIG. 6), setting the initial program status word, initial virtual stack pointer, and initial virtual stack boundaries, as well as setting the initial value for register r0 to the virtual address of a slave virtual-mode startup routine (see step 504 of FIG. 6).

Memory management information for the slave is also prepared at step 403. Since the kernel mapping is common for all processors, the MMU register contents will be common for all operating system kernel sections However, access to MMUs on slave processor 25 is not possible from master processor 12 (and vice versa), and therefore the actual initialization of the MMU mapping register contents must be performed by slave processor 25. One technique for accomplishing this is to make use of the block-move capability of the microprocessor. This involves initializing a series of block move areas in the initial slave process control block such that when a process switch to the slave's initial process control block is performed, the MMU mapping registers will be automatically initialized as part of the XSWITCH_THREE() macro-ROM sequence of the microprocessor (see the WE 32100 Microprocessor Information Manual).

Once the slave's initial process control block has been setup, various control parameters related to slave support are initialized, at step 403. Finally, the physical address of the slave physical startup routine (see steps 501 and 502 of FIG. 5) is placed in a location in private memory 101 of slave processor 25 that is being polled by the slave's firmware, at step 404, to signal slave processor 25 to start executing the slave physical startup routine Processor 12 then returns to the master initialization routine to complete system initialization in the conventional uniprocessor manner, at step 405.

The firmware of master processor 12 and slave processor 25 is identical. Upon power-up, the firmware checks whether the processor is the master or the slave. Illustratively, this check is performed by examining the address of the bus 11 slot to which the processor is connected. If the processor is the master, it commences executing at a predetermined memory address, in the conventional manner If the processor is a slave, after initialization it begins to poll a predetermined location.

Figure 6:
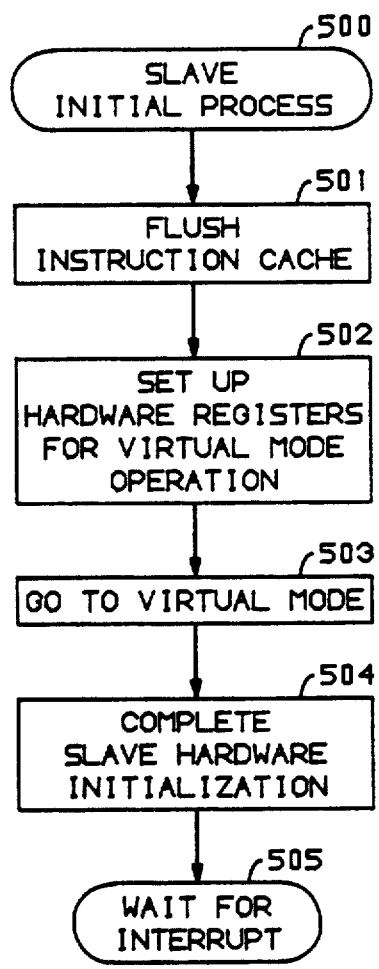

The initial slave process executed by slave processor 25 is flowcharted in FIG. 6. Once slave processor 25 firmware that is polling the above-mentioned location sees this location set to a non-zero value, at step 500, control is transferred to the physical address indicated by that value. This commences execution of the physical startup routine for slave processor 25. This is the first code to execute on slave processor 25. The purpose of this code is to complete slave processor 25 hardware initialization.

The first step is to flush the slave processor 25 instruction cache, at step 501, since its contents are unpredictable. Once this has been accomplished, via the conventional CFLUSH instruction, the slave's interrupt stack pointer register is initialized to point to the second word in the interrupt stack, at step 502. (The first word in the interrupt stack was initialized to be the physical address of the slave's initial process control block). Also at step 502, a process switch to the slave's initial process control block is performed by the conventional RETPS instruction. As part of this process switch, the slave's process control block pointer register is set to the physical address of the intermediate portion of the slave's initial process control block, the initial program counter is set to the physical address of the code to enable virtual mode addressing, register r0 is set to contain the virtual address of the slave's virtual-mode startup routine (step 504), the slave's MMU mapping registers are set to the same values as the master's MMU mapping registers (thus presenting a common master/slave mapping), and the other initial register values are setup for slave processor 25, as prepared by the slave initialization routine of FIG. 5.

Now execution continues at the slave processor 25 enbvjmp code, at step 503, which resets the process control block pointer register to the virtual address of the intermediate portion of the slave's initial process control block, and executes the conventional ENBVJMP instruction which enables virtual addressing for slave processor 25 and transfers to the virtual address contained in register r0.

The slave virtual-mode startup routine is represented by step 504. It is responsible for final initialization of slave processor 25 and for passing a synchronization message back to master processor 12 to indicate that initialization has completed. This final initialization includes slave processor 25 hardware initializations to set the cacheable bit in the slave MMU configuration registers, flush and enable the system cache associated with slave processor 25, disable all slave processor 25 hardware timers (they are never enabled, as there is no need for software support for slave timer interrupts), perform standard slave processor 25 MAU initialization via the standard mauinit() routine, initialize the interrupt controller, and enable interrupts on slave processor 25 (the initial slave program status word has all interrupts masked, so even though interrupts are enabled by the hardware circuitry, they are still masked for now).

Once the hardware of slave processor 25 has been initialized, the process control blocks resident in private memory 101 of slave processor 25 are also initialized with respect to the slave handlers associated with these process control blocks, at step 504. This involves redefining initial values and stack bounds for the slave stack exception handler and slave system error exception handler, as the handling of these exception conditions is different for slave processor 25 from the conventional handling done for master processor 12.

Finally, a message is sent to master processor 12 indicating that slave processor 25 has been initialized, and the program status word interrupt level of slave processor 25 is set to 0 to allow interrupt processing for interrupts generated on slave processor 25, at step 505.

Figure 7:
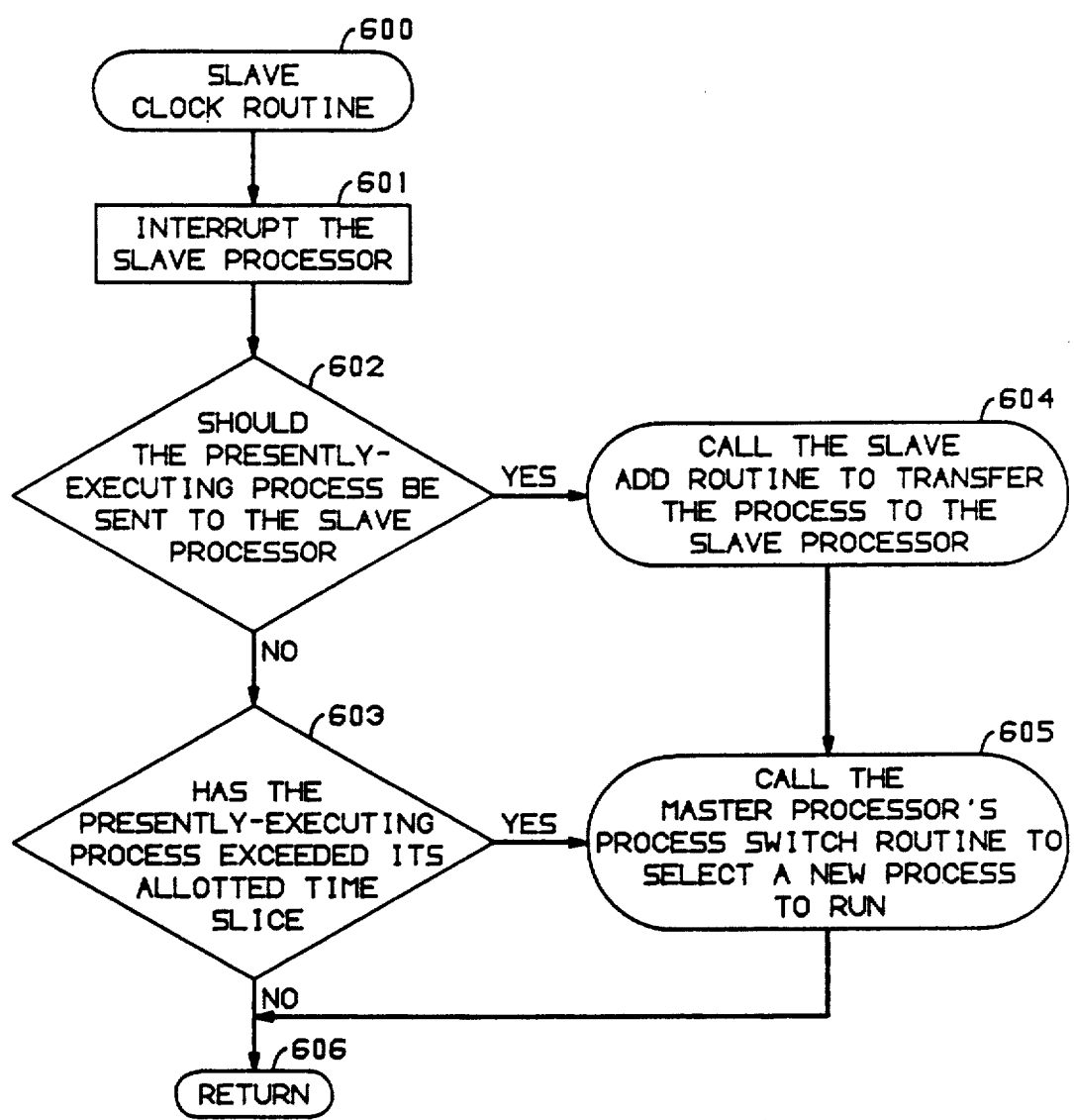

FIG. 7 flowcharts the slave clock routine which is called as part of the clock interrupt-handling routine of master processor 12.

Although the hardware of slave processor 25 supports timer interrupts in exactly the same manner as master processor 12, in this illustrative embodiment there is no need for software support for timer interrupts on the slave. Instead, whenever a timer interrupt occurs on the master, a check is made of the UTILIZE flag, and if it is set (indicating presence of a slave processor 25), the routine of FIG. 7 is called, at step 600. This routine performs three basic functions: interrupts slave processor 25, at step 601; determines if the process presently executing on master processor 12 is eligible for execution on slave processor 25, at step 602; and if not, determines if a process switch should occur due to time-slice expiration for the process presently executing on master processor 12, at step 603.

The determination of slave processor 25 execution worthiness at step 602 is based on whether a process can execute on slave processor 25. A process can execute on slave processor 25 only if it was in user-mode at the time of the clock interrupt and only if the process is not presently being profiled, i.e., conventionally monitored by the system for information-gathering purposes. If at step 602 a process is deemed capable of execution on slave processor 25, a SONSLAVE bit in the conventional processor p_flag field is set to so indicate, at step 604, and the standard runrun flag is set, at step 605. The former posts a request to a slave add routine (see FIG. 8) to transfer the process to slave processor 25, and the latter posts a request to the conventional pswtch() routine for a process switch that is acted upon before the clock interrupt handler returns to the interrupted program, at step 606.

Time-slicing is implemented at step 603 by associating with each process a counter that is incremented every clock tick, and once the counter is found to exceed a system threshold, a process switch request is posted via the runrun flag, at step 605. Illustratively, the process switch request is made only if there are runnable processes in the system that are blocked. Illustratively, the counter is reset every process switch.

Figure 8:
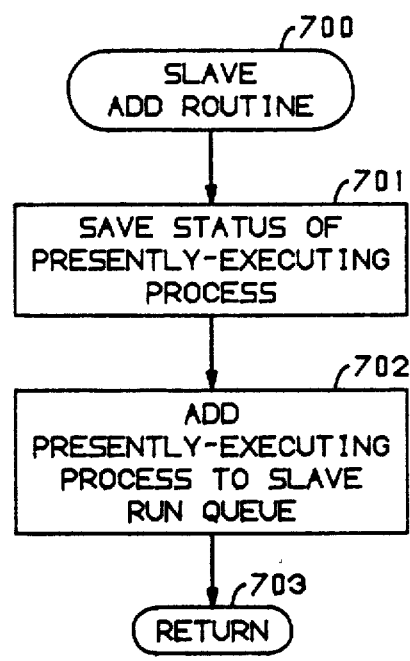

FIG. 8 flowcharts the slave add routine which executes on master processor 12 and may be called at step 700 by an interrupt handler routine of either processor to add the process presently executing on master processor 12 to the run queue of slave processor 25. The slave add routine is similar to the standard setrq() routine for the master processor 12 run queue: in fact, the setrq() routine has a check in it to see if the process should be transferred to the slave processor 25 run queue (SONSLAVE flag in the p_flag field), and if so, calls the slave add routine to perform the transfer. Transferring a process to the slave processor 25 run queue involves saving the MAU status of the presently-executing process (equivalent to the standard mau_save()routine), at step 701, and actually adding the process to the slave processor 25 run queue, at step 702, before returning at step 703. If slave processor 25 is idle, it may be interrupted to ensure immediate execution of the newly-added process.

Figure 9:
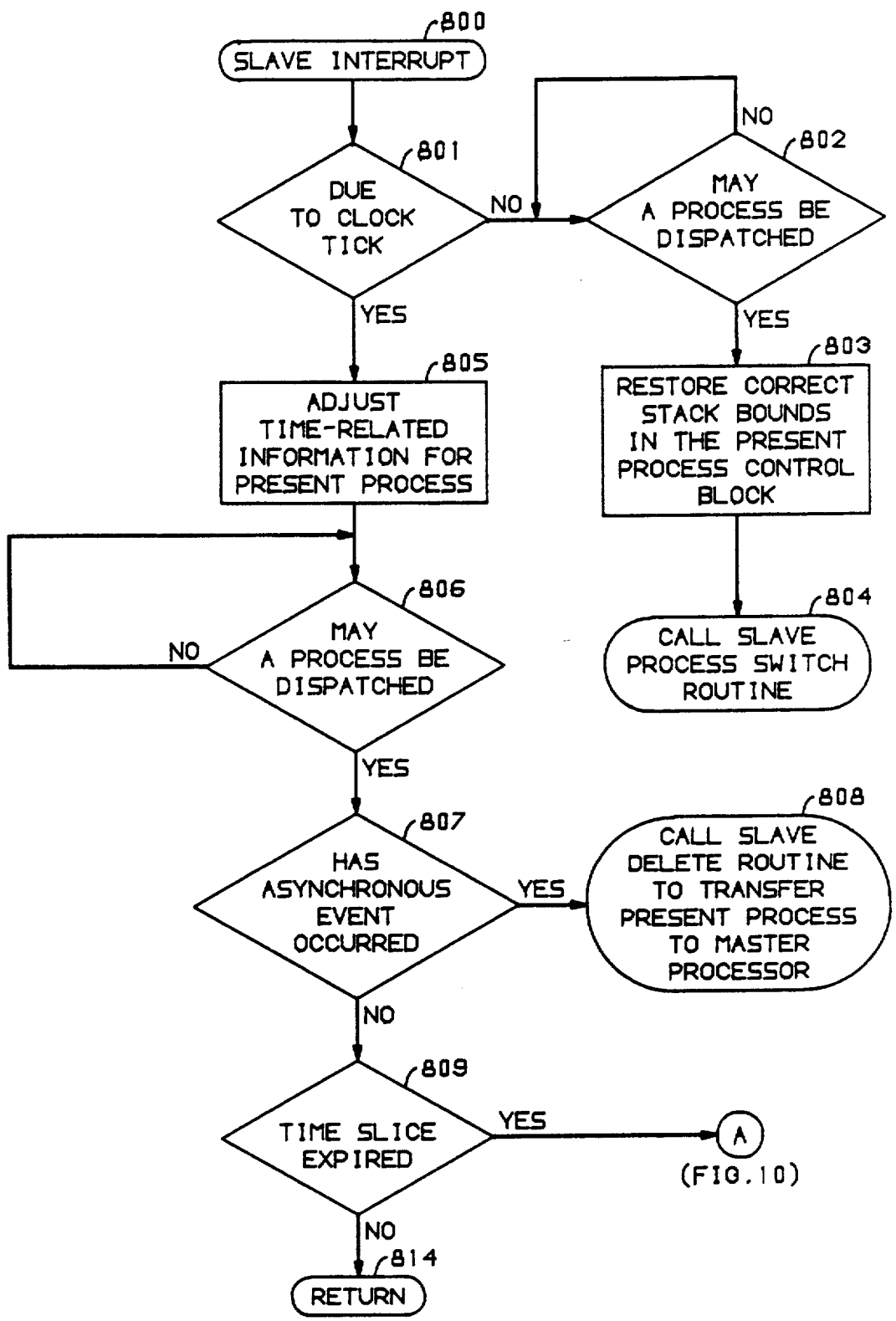
Figure 10:
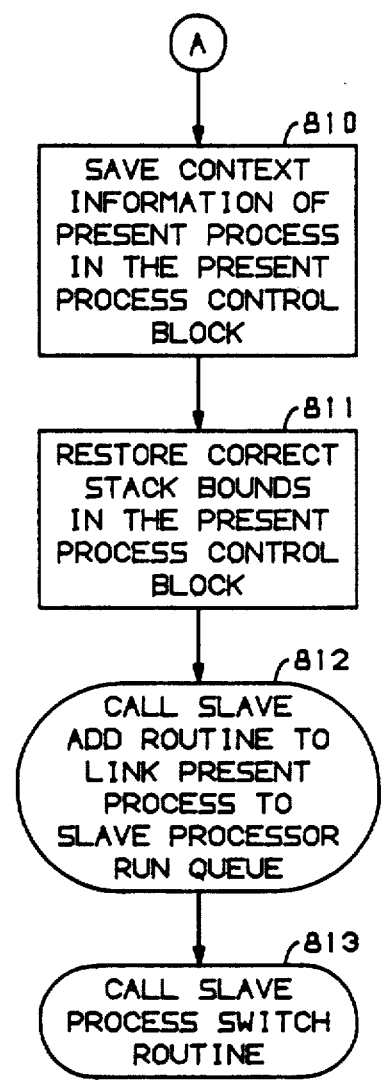
Figure 11:
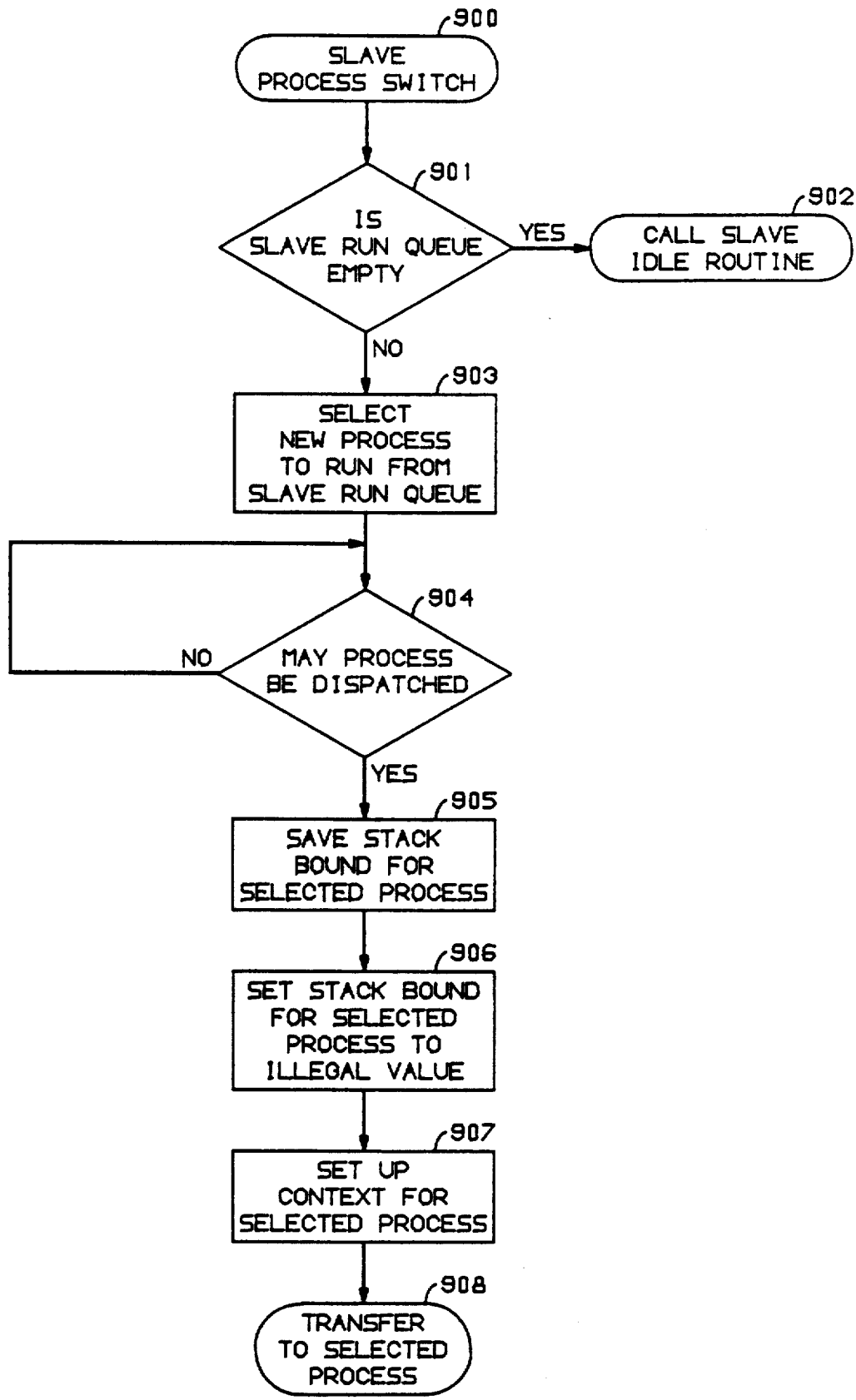
Figure 12:
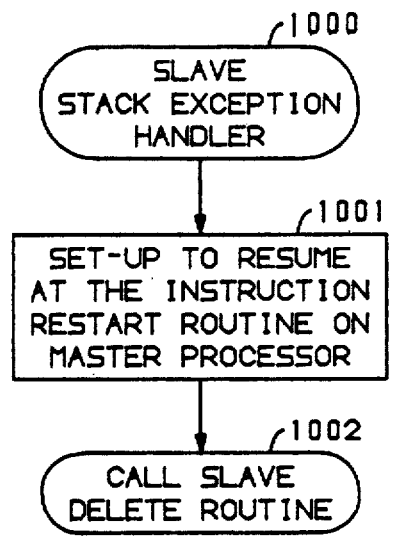
Figure 13:
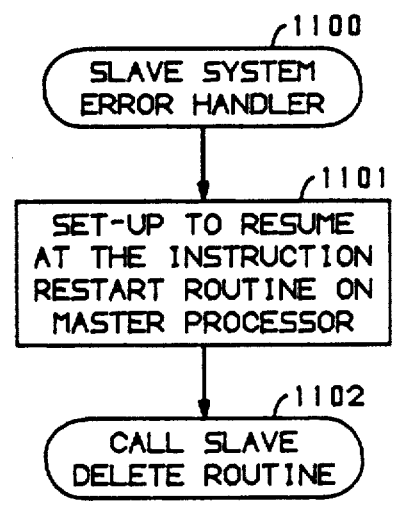
Figure 14:
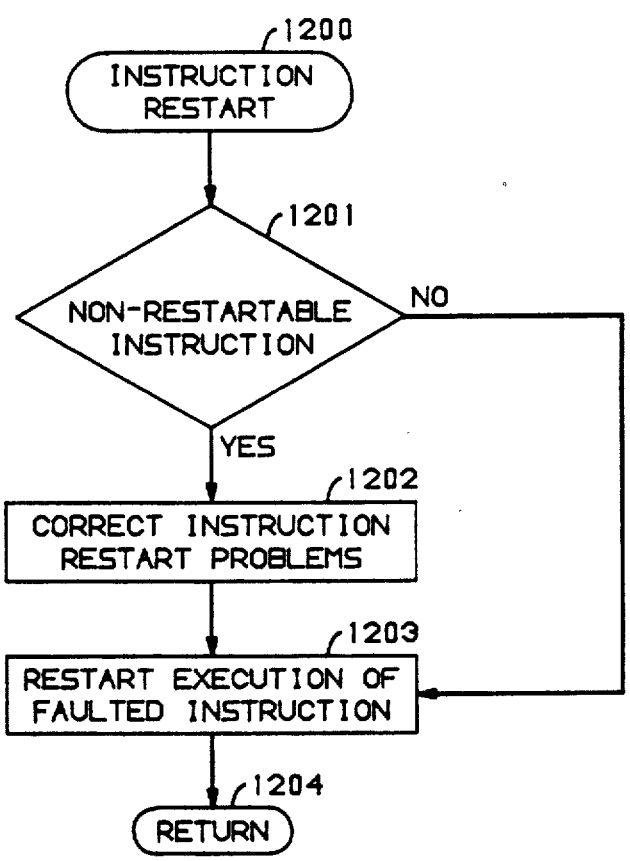
Figure 15:
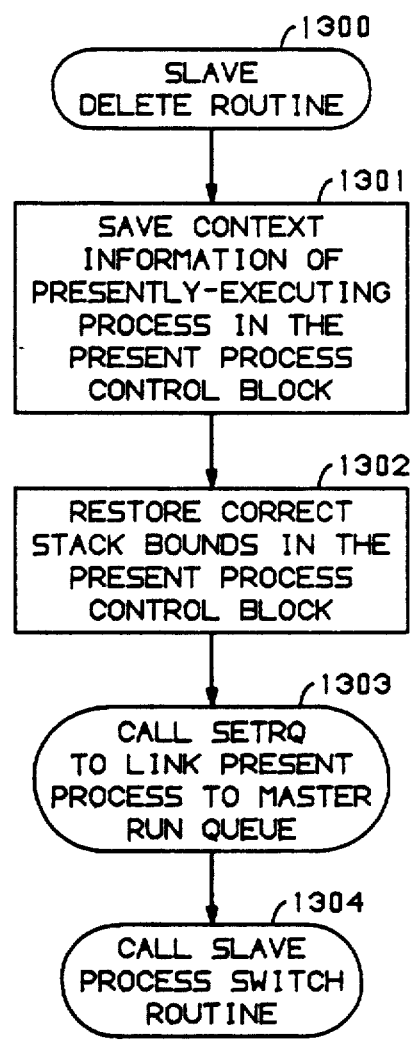
Figure 16:
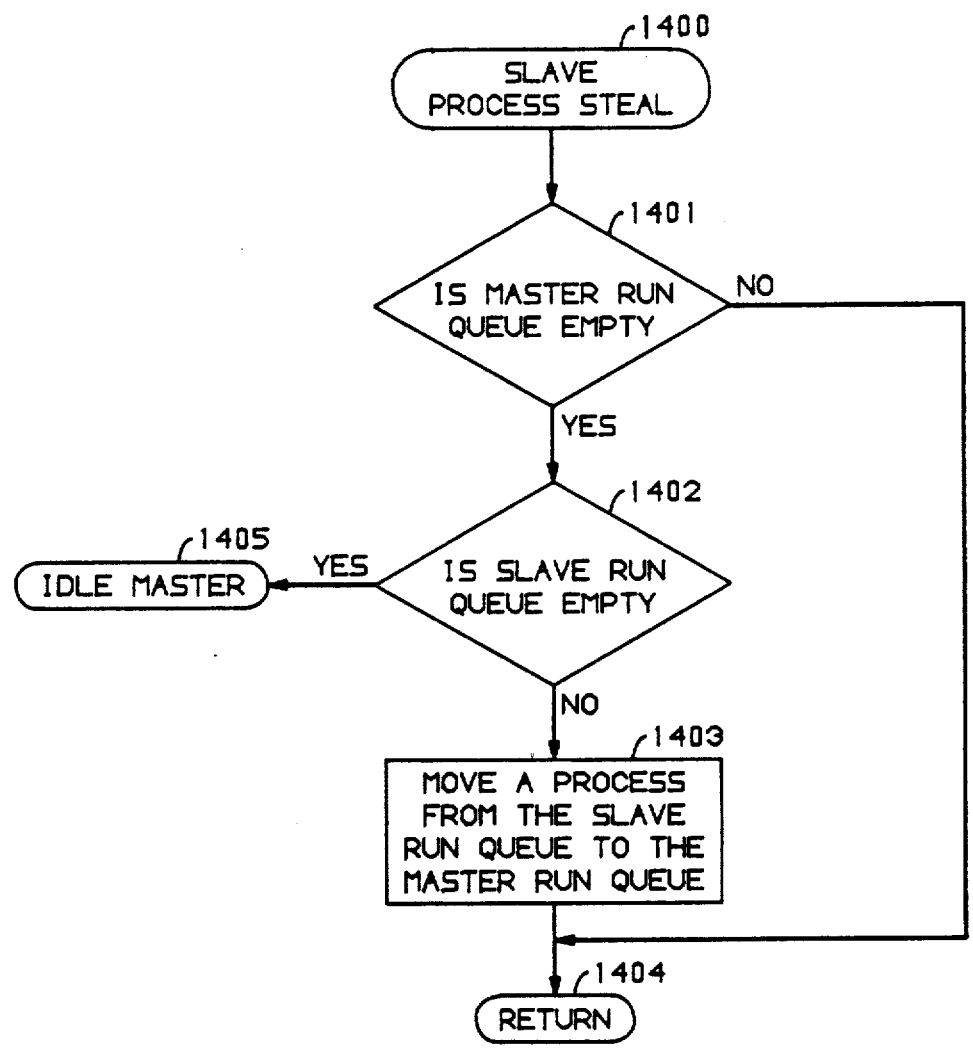
Figure 17:
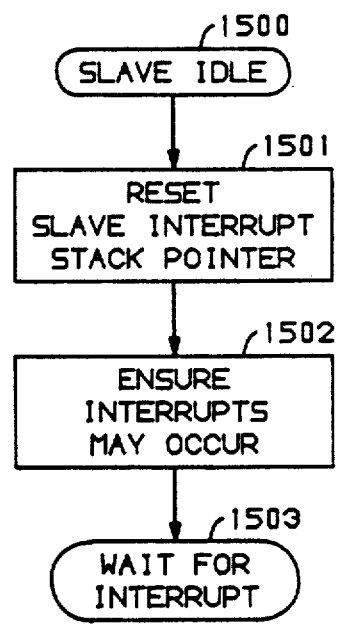

FIGS. 9 and 10 flowchart the slave processor system interrupt handler routine, or slave interrupt routine for short, which executes on slave processor 25. There are only two reasons in this example for slave processor 25 to be interrupted: either a clock interrupt occurred on master processor 12, or a process was transferred from master processor 12 to slave processor 25 run queue while slave processor 25 was idle.

The two types of interrupts are distinguishable by checking, at step 801, if the conventional time counter lbolt of master processor 12 has changed since the last time the slave interrupt routine was invoked: if it has changed, then a time interval has elapsed since the last interrupt and the present interrupt is due to this passing of time; if no change has occurred, the present interrupt is due to the addition of a process to slave processor 25 run queue while slave processor 25 was idle.

If the interrupt was not due to expiration of a time interval, the first action performed is a check of a flag variable, at step 802, to see if master processor 12 is trying to reclaim memory. If so, the execution of processes on slave processor 25 is suspended until the reclamation has completed. This is necessary since there exists a potential corruption problem if the reclamation processing modifies a page descriptor that is resident in the slave processor 25 MMU descriptor caches: there is no technique for informing slave processor 25 of the change in the descriptor, and therefore slave processor 25 will be using obsolete mapping information. Once reclamation is completed, stack bounds 217, 218 of the process that is presently executing on slave processor 25 are restored to their correct value (see step 1302 of FIG. v15), at step 803, and a process switch is forced on slave processor 25 by calling a slave process switch routine (see FIG. v11), at step 804. The slave process switch routine ensures that MMU mapping registers are loaded with new information, which also has the beneficial effect of flushing the potentially-corrupt MMU cache descriptor entries.

If the interrupt is determined at step 801 to be caused by expiration of a time interval, time-related information maintained for the interrupted process is adjusted, at step 805. The elapsed time since the last invocation of the slave interrupt routine is calculated, and the present lbolt value is saved. If slave processor 25 is idle, i.e., slave processor 25 was not executing a process at the time the slave interrupt routine was called, the elapsed time is accounted for as system idle time in the same manner as master processor 12 idle time (i.e. sysinfo.cpu[CPU_IDLE) is incremented by the amount of elapsed time). Otherwise, the timers and timing accumulators related to an executing process are incremented by the amount of elapsed time.

Next, a check like that of step 802 is made, at step 806, to determine if master processor 12 is trying to reclaim memory, and if so, the execution of processes on slave processor 25 is suspended until reclamation has completed. At this point, a check is made for whether the presently-executing process has had an asynchronous signal posted for it while it was executing on slave processor 25, at step 807. If so, the process is sent back to master processor 12 and a process switch is performed on slave processor 25, by invocation of a slave delete routine (see FIG. v15), at step 808.

If there are no asynchronous signals pending for the presently-executing process, as determined at step 807, a check is made for whether the just-completed incrementing of the time accumulators for the process resulted in a p slice counter value greater than the system time-slice threshold, at step 809. If so, the context information of the presently-executing process is stored in that process' process control block, at step 810, the stack bounds 217, 218 of the process are restored to their correct value (see step 1302 of FIG. v15), at step 811, the slave add routine of FIG. 8 is called to link the presently-executing process back to the slave processor 25 run queue, at step 812, and then a process switch is forced on slave processor 25 by calling the slave process switch routine of FIG. v11, at step 813.

If master processor 12 was not reclaiming as determined at step 806, if there are no signals pending for the present process as determined at step 807, and if the present process has not exceeded its time slice as determined at step 809, control is transferred directly back to the process that was executing on slave processor 25 at the time of the interrupt, at step 814.

FIG. v11 flowcharts the slave process switch routine, which executes on slave processor 25. It is responsible for selecting the next process to execute on slave processor 25, as well as initialization of slave processor 25 for the new process. It is equivalent to the standard pswtch() routine of master processor 12.

Following call of the routine at step 900, a check is made of whether there are any processes on slave processor 25 run queue, at step 901. If not, the routine transitions slave processor 25 into the idle state by calling a slave idle routine (see FIG. v17), at step 902. If there are processes on slave processor 25 run queue, then the selection for the next process to execute is made, at step 903. For example, the process selection algorithm implemented in the pswtch() routine may be used.

Once a process has been selected for execution, a check is made to ensure that no reclamation (see discussion above) is being done by master processor 12, at step 904. Once it has been determined that no reclamation is in effect, the actual value of stack upper bound 218 for the process that is to be executed is saved in a variable, at step 905, and the in-effect stack upper bound value for this net process is set to the lowest possible stack address (zero in the illustrative example), at step 906. Setting the stack upper-bound value to 0 for the process running on slave processor 25 ensures that no slave user process will ever enter privileged code through a normal exception or a GATE: instead, whenever a need arises for privileged-mode processing, a stack exception will result and place the stack exception handler routine (see FIG. v12) of slave processor 25 in control. After the stack bound is changed, the context of slave processor 25 is setup for the new process, at step 907, by loading the MMU mapping registers and also MAU registers (if necessary), clearing MMU fault indications, and resetting the time slice counter for the process (p slice). Execution is then transferred to the new process, at step 908.

FIG. v12 flowcharts the slave stack exception handler process. Given that minimal privileged-mode processing is implemented on slave processor 25 (no privileged mode processing is done on slave processor 25 on behalf of user processes), the action performed by the slave stack exception handler is to transfer the presently-executing user process to master processor 12. This is implemented by calling a slave delete routine (see FIG. v15), at step 1002. Illustratively in this example, because the address of the faulting instruction is already saved in the process control block as result of stack exception handling, the faulting instruction is reexecuted once the process restarts execution on master processor 12. This feature is fairly typical of systems with demand-paged memory management. This results in repeating whatever actions caused the original fault on slave processor 25, therefore avoiding the need for the slave stack exception handler to preserve potential fault indicators and the master exception handling routines to look for the saved potential fault indicators.

However, not all instructions may be reexecuted safely in this illustrative embodiment: for example, certain multiword MAU instructions with destructive operand overlap may not be restartable if a partial destination operand update has been done before the exception, thereby corrupting a source operand. Therefore, when the process is restarted on master processor 12, an instruction restart routine (see FIG. v14) must be invoked to avoid restart problems. This is illustratively accomplished, at step 1001, by removing the address of the faulting instruction from the process control block and substituting therefor the starting address of the instruction restart routine, and storing the removed faulting instruction's address in a variable. When the instruction restart routine completes, it restores the faulting instruction's address in the process control block.

Although far less usual than normal exceptions, another exception condition is possible when executing user-mode processes: system error. This category includes things like alignment faults and hardware problems encountered as a result of actions performed by slave processor 25. In these situations, the slave system error handler process flowcharted in FIG. v13 is invoked, at step 1100. It behaves exactly the same as the slave stack exception handler process of FIG. v12: the user process PCB is setup, at step 1101, so that execution on master processor 12 will commence with the instruction restart routine, and the process is then transferred to master processor 12 through invocation of the slave delete routine, at step 1102.

The instruction restart routine is flowcharted in FIG. v14. This routine is invoked, at step 1200, on master processor 12 whenever a process that was transferred from slave processor 25 due to occurrence of an exception or an interrupt begins to execute on master processor 12. The routine checks whether the faulting instruction is a non-restartable instruction, at step 1201, such as an MAU instruction with destructive operand overlap, and if so, it corrects the restart problems, at step 1202. The routine uses existing routines to handle restartability problems in the same manner as the standard, master, stack exception handler deals with MAU restart problems The instruction restart routine then restores the address of the user process' faulted instruction to the process control block of the faulted process to cause execution of the faulted instruction, at step 1203, and returns at step 1204 to execution of that instruction.

FIG. v15 flowcharts the slave delete routine. This routine is invoked on slave processor 25 whenever it is deemed necessary to transfer a process presently executing on slave processor 25 to the master processor 12 run queue. As mentioned above, this situation can be the result of either an asynchronous signal having been posted for a presently-executing process (see step 808 of FIG. 9), or the presently-executing slave process having need of privileged-mode processing (see step 1002 of FIG. v12 and step 1102 of FIG. 2). In either case, the actions performed are the same: preserve present status of the process, add the present process to master processor 12 run queue, and select a new process for execution on slave processor v25.

Preserving the status for the present process is essentially completed by the time the slave delete routine is called: all paths leading to invocation of the slave delete routine result in the saving of the required CPU-related registers in the process control block for the presently-executing slave process. However, the process control block only defines the hardware context of a process, but does not define the software-maintained information for the process, such as MAU register contents. Hence, the software-defined state must be saved in the process' PCB, at step 1301. Also, the SONSLAVE flag is reset in the p flag field. This leaves only restoration of the actual value of stack upper bound 218 to be performed, at step 1302.

Once this has been accomplished, the process is added to master processor 12 run queue through invocation of the standard setrq() routine, at step 1303, and a new process is chosen for execution on slave processor 25 through invocation of the slave process switch routine of FIG. v11, at step 1304.

FIG. v16 flowcharts the slave process steal routine, which is invoked on master processor 12 at the start of the pswtch() routine. The pswtch() routine calls the slave process steal routine, at step 1400, to avoid situations where master processor 12 run queue is empty and master processor 12 sits idle, at step 1401, and there exists a backlog of user-mode processes on slave processor 25 run queue, at step 1402. This routine simply takes a process off of slave processor 25 run queue, following the same process selection algorithm as the slave process switch routine of FIG. v11, and moves the process to master processor 12 run queue, at step 1403. Following step 1403, or if master processor 12 run queue is not found to be empty at step 1401, the routine returns to the pswtch() routine, at step 1404, to select a process from master processor 12 run queue for execution on master processor 12. If the master processor 12 run queue is found to be empty, at step 1401, and the slave processor 25 run queue is also found to be empty, at step 1402, the routine idles master processor 12, at step 1405, by execution of a standard WAIT instruction. Master processor 12 then waits for occurrence of an interrupt.

FIG. v17 flowcharts the slave idle routine, which is invoked, at step 1500, on slave processor 25 if no processes are available for execution on slave processor 25. This routine resets slave processor 25 interrupt stack pointer, at step 1501, lowers the interrupt priority level (set high by hardware operations preceding invocation of the slave stack exception handler) in the program status word to the lowest level to allow all interrupts, at step 1502, and executes a WAIT instruction, at step 1503. Upon occurrence of an interrupt, execution on slave processor 25 is resumed at the slave interrupt routine of v FIGS. 9 and 10.

Of course, it should be understood that various changes and modifications to the illustrative embodiment described above will be apparent to those skilled in the art. For example, the AT&T 3B2 uniprocessor computer and other uniprocessor computers may be expanded to a multiprocessor configuration in like manner. Also, more than one slave processor may be added to and used in the system, in substantially the same manner as the one slave processor is added and used. Furthermore, slave processors need not be identical to each other or to the master processor, but each may be based on a different microprocessor architecture. Such changes and modifications can be made without departing from the spirit and the scope of the invention and without diminishing its attendant advantages. It is therefore intended that all such changes and modifications be covered by the following claims.

What is claimed is:

1. A method of operating a multiprocessor system having a plurality of processors, comprising the steps of:
    when actions of a first type are not to be executed on a first processor of the system, creating in the first processor an error whose existence is always checked during an attempt in the first processor to execute an action of a first type, by operation of one of the processors of the multiprocessor system;
    attempting to execute an action of the first type during execution of a process in the first processor of the system;
    checking for existence of the error during the attempt, by operation of the first processor,
    stopping execution of the process in response to encountering the error during the check on the first processor,
    selectively invoking execution of a procedure for handling the error on the first processor, in response to the encounter, and
    transferring the process that had been executing on the first processor to a second processor of the system for execution, by executing the error handling procedure on the first processor.

2. The method of claim 1 wherein the step of attempting comprises the step of:
    initiating transfer of execution on the first processor to an operating system function of the first processor.

3. The method of claim 1 wherein the step of attempting comprises the step of:

4. The method of claim 1, wherein the step of checking comprises the step of:
    checking for existence of the error by an activity implemented in one of hardware and firmware of the first processor.

5. The method of claim 1, wherein the step of creating comprises the step of
    inserting a fault into the process executing on the first processor, by operation of the one processor of the multiprocessor system; and wherein the step of checking comprises the step of
    checking for existence of the fault by operating of the first processor.

6. The method of claim 1 wherein the step of creating comprises the step of
    corrupting execution stack bounds of the process executing on the first processor by operation of the one processor of the system to ensure existence of a stack bounds exception; and wherein the step of checking comprises the step of
    checking for a stack bounds exception in the first processor by operation of the first processor.

7. The method of claim 1 further comprising the step of:
- starting execution of the process on the second processor; and
- executing the function of the first type on the second processor.

8. The method of claim 7 wherein
the steps of attempting, checking, and transferring are performed by the first processor while the second processor is active and performing other activities, and wherein
the steps of starting and executing are performed by the second processor while the first processor is active and performing other activities.

9. The method of claim 1 wherein
the steps of attempting, checking, and transferring are performed by the first processor while the second processor is active and performing other activities.

10. A method of operating a multiprocessor system having a plurality of processors, comprising the steps of:
- creating a stack bounds exception on a slave processor of the system by operation of one of the processors of the system;
- attempting to enter a privileged execution mode on the slave processor, during execution of a user execution mode process on the slave processor;
- checking for existence of a stack bounds exception during the attempt, by operation of the slave processor;
- encountering the stack bounds exception during the check;
- selectively invoking execution of a process for handling the exception on the slave processor, in response to the encounter;
- transferring the user execution mode process that has been executing on the slave processor to a master processor of the system for execution, by executing the handler process on the slave processor, and
- starting execution of the transferred process on the master processor substantially at a point at which process execution stopped on the slave processor.

11. The method of claim 10 further comprising the steps of:
- attempting to enter the privileged execution mode on the master processor, during execution of the user execution mode process on the master processor;
- checking for existence of a stack bound exception on the master processor during the attempt, by operation of the master processor; and
- entering the privileged execution mode on the master processor, in response to not encountering the stack bounds exception during the check.

12. The method of claim 10 wherein the step of creating comprises the step of
- corrupting execution stack bounds of the user-mode process, prior to executing the user-mode process on the slave processor, by operation of the one processor of the system; wherein the step of checking comprises the step of
- checking a stack pointer against the stack bounds of the process, by operation of the slave processor; and the method further comprising the step of
- restoring the stack bounds of the process, by operation of one of the processors of the system, prior to executing the transferred process on the master processor.

13. A method of operating a multiprocessor system having a plurality of processors, comprising the steps of:
- corrupting a value of execution stack bounds of a user execution mode process prior to execution of the process on a slave processor of the system, by operation of one of the processors of the system;
- attempting to change process execution level from a user mode to a privileged mode on the slave processor, during execution of an instruction of the user-mode process on the slave processor;
- performing one of a firmware-implemented and a hardware-implemented check of a value of an execution stack pointer of the user process against values of the execution stack bounds of the user-mode process on the slave processor;
- encountering a stack bounds exception during the check on the slave processor;
- stopping execution of the user-mode process on the slave processor at the instruction, in response to the encounter,
- invoking execution of a stack exception handler process on the slave processor, in response to the encounter;
- restoring to uncorrupted values the values of the execution stack bounds of the user-mode process, by executing the handler process on the slave processor;
- transferring the user-mode process for execution from the slave processor to a master processor of the system, by executing the handler process on the slave processor;
- starting execution of the user process on the master processor at the instruction; and
- entering the privileged execution mode on the master processor.

14. The method of claim 13 wherein the step of entering privileged execution mode comprises the steps of
- attempting to change process execution level from the user mode to the privileged mode on the master processor, during execution of the instruction of the user process on the master processor;
- performing one of a firmware-implemented and a hardware-implemented check of an execution stack pointer of the user process against the stack bounds of the user process on the master processor; and
- entering the privileged execution mode on the master processor, in response to not encountering a stack bounds exception during the check.

15. A multiprocessor system comprising:
a first and a second processor;
means for creating in the first processor an error whose existence is always checked during an attempt to execute an action of a first type on the first processor of the system, by operation of a processor of the multiprocessor system, the means creating the error when actions of the first type are not to be executed on the first processor;
means in the first processor for checking for existence of the error in response to an attempt during execution of a process in the first processor to execute an action of the first type
means for stopping execution of the process in response to encountering the error during the check on the first processor;
means for selectively invoking execution of a procedure for handling the error on the first processor, in response to the encounter; and means in the first processor for transferring the process that had been executing on the first processor to a second processor of the system for execution, by executing the error handling procedure.

16. The system of claim 15 wherein the checking means check for existence of the error in response to an attempt during execution of a process to initiate transfer of execution in the first processor to an operation system function of the first processor.

17. The system of claim 15 wherein the checking means check for existence of the error in response to an attempt during execution of a process to enter a privileged execution mode in the first processor.

18. The system of claim 15 wherein the checking means comprise:
one of a hardware-implemented and a firmware-implemented arrangement in the first processor for checking for existence of the error.

19. The system of claim 15 wherein the creating means comprise
means for inserting a fault into the process executing on the first processor; and wherein the checking means comprise
means for checking for existence of the fault in the first processor.

20. The system of claim 15 wherein the creating means comprise
means for corrupting execution stack bounds of the process executing on the first processor to ensure existence of a stack bounds exception; and wherein the checking means comprise
means for checking for a stack bounds exception in the first processor.

21. The system of claim 15 wherein the second processor includes:
means for executing the v action of the first type v in the second processor, in response to start of execution of the process on the second processor.

22. The system of claim 21 wherein
the first processor executes the process, the means for checking check for existence of the predetermined condition, and the means for transferring transfer the process to the second processor, while the second processor is active and performing other activities, and wherein
the second processor starts execution of the process and the means for executing execute the action of the first type while the first process is active and performing other activities.

23. The system of claim 15 wherein
the first processor executes the process, the means for checking check for existence of the predetermined condition, and the means for transferring transfer the process to the second processor, while the second processor is active and performing other activities.

24. A multiprocessor system comprising:
a slave and a master processor; the slave processor including
means for creating existence of a stack bounds exception in the slave processor, by operation of a processor of the multiprocessor system,
means for checking for existence of the stack bounds exception in response to an attempt during execution of a user execution mode process to enter a privileged execution mode,
means for selectively invoking execution of a process for handling the exception in response to detecting existence of a stack bounds exception, and
means, responsive to the checking and invoking means, for transferring the user-mode process from the slave processor to the master processor by executing the handler process; and the master processor including
means for executing the process starting substantially at a point at which process execution stopped on the slave processor.

25. The system of claim 24 wherein the master processor further includes:
means, coupled to the executing means, for checking for existence of a stack bounds exception in response to an attempt during execution of the process to enter the privileged execution mode, and for causing entry of the privileged execution mode in response to not encountering the stack bounds exception during the check.

26. The system of claim 24 wherein the means for creating existence of an exception comprise
means for corrupting execution stack bounds of the user-mode process prior to execution of the user-mode process on the slave processor, wherein the checking and invoking means comprise
means for checking a stack pointer against the stack bounds of the process; and wherein the system further comprises
means for restoring the stack bounds of the user-mode process prior to execution of the transferred user-mode process on the master processor.

27. A multiprocessor system comprising:
a slave and a master processor;
the slave processor including
means for corrupting a value of execution stack bounds of a user execution mode process prior to execution of the process on the slave processor,
one of a hardware-implemented and firmware-implemented arrangement for checking a value of an execution stack pointer against values of the execution stack bounds of the user execution mode process, in response to an attempt during execution of an instruction of the user execution mode process to enter a privileged execution mode on the slave processor, and for stopping execution of the user execution mode process at the instruction and invoking execution of a stack exception handler process, in response to encountering a stack bounds exception during the check, and
means, coupled to the arrangement, for executing the handler process thereby to restore to uncorrupted values the values of the execution stack bounds of the user execution mode process and to transfer the user execution mode process from the slave processor to the master processor for execution; and
the master processor including
means for starting execution of the transferred process by entering the privileged execution mode on the master processor.

28. The system of claim 27 wherein the means of the master processor for starting execution of the transferred process comprise:
means for starting execution of the transferred process at the instruction; and
one of a hardware-implemented and a firmware-implemented arrangement for checking a value of an execution stack pointer against values of the stack bounds of the process, in response to an attempt during execution of the instruction to enter the privileged execution mode on the master processor, and for causing the privileged mode to be entered in response to not encountering a stack bound exception during the check.

* * * * *